United States Patent [19]
Peters, Jr.

[11] 3,886,342
[45] May 27, 1975

[54] INDUCTION COOKING UNIT HAVING ALL PAN SAFE OPERATION, WIDE RANGE POWER CONTROL AND LOW START-UP AND SHUT-DOWN TRANSIENTS

[75] Inventor: Philip H. Peters, Jr., Greenwich, N.Y.

[73] Assignee: Environment/One Corporation, Schenectady, N.Y.

[22] Filed: Apr. 26, 1973

[21] Appl. No.: 354,764

[52] U.S. Cl. ............. 219/10.49; 219/10.77; 321/18
[51] Int. Cl. ............................................. H05b 5/04
[58] Field of Search .................... 321/2, 18, 44, 14; 219/10.49, 10.77

[56] References Cited
UNITED STATES PATENTS

| 3,461,375 | 8/1969 | Nestlen .................................. 321/43 |
| 3,553,567 | 1/1971 | Pesce et al ............................. 321/14 |
| 3,566,243 | 2/1971 | Landis ................................. 321/18 X |
| 3,596,165 | 7/1971 | Andrews .............................. 321/18 X |

Primary Examiner—Bruce A. Reynolds
Attorney, Agent, or Firm—Charles W. Helzer

[57] ABSTRACT

An induction heating unit including inverter circuit means comprised by a gate controlled thyristor and commutation circuit coupled together in circuit relationship and excited from a set of power supply terminals connected to a source of excitation potential. An induction heating coil is coupled to and excited by the inverter circuit means in a manner such that the loading on the induction heating coil determines at least in part the operating frequency at which the inverter circuit means operates. Gating circuit means comprised by a gating signal generator and enabling circuit means are coupled to and control turn-on of the gate control thyristor with the gating circuit means comprising a feedback sensing circuit coupled to the induction heating coil for deriving a feedback trigger signal synchronized with the frequency of operation of the commutation circuit.

29 Claims, 24 Drawing Figures

FIG. 3
ZERO POINT OPERATED TRIGGER
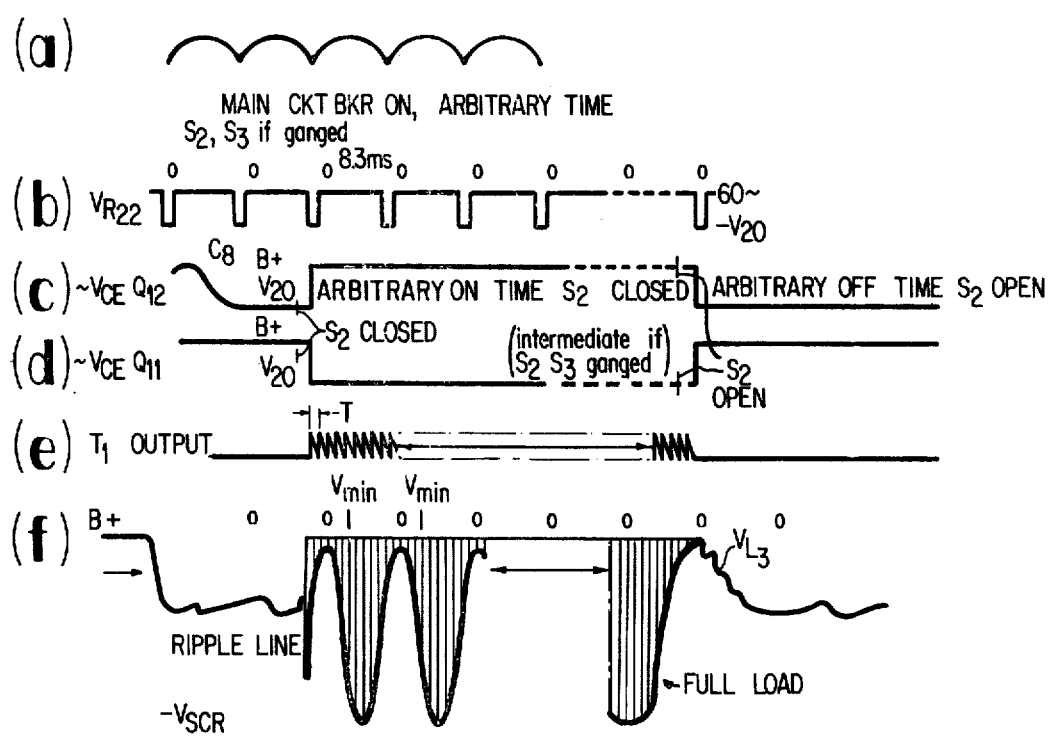
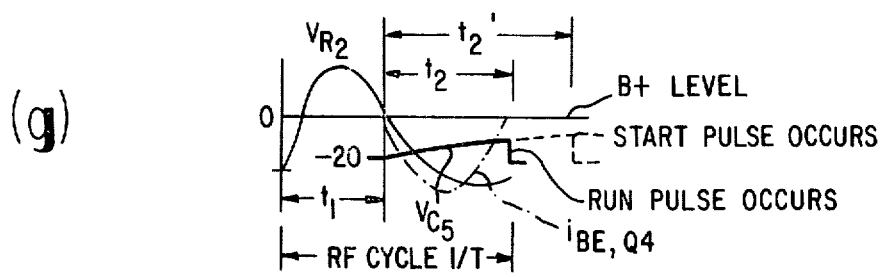

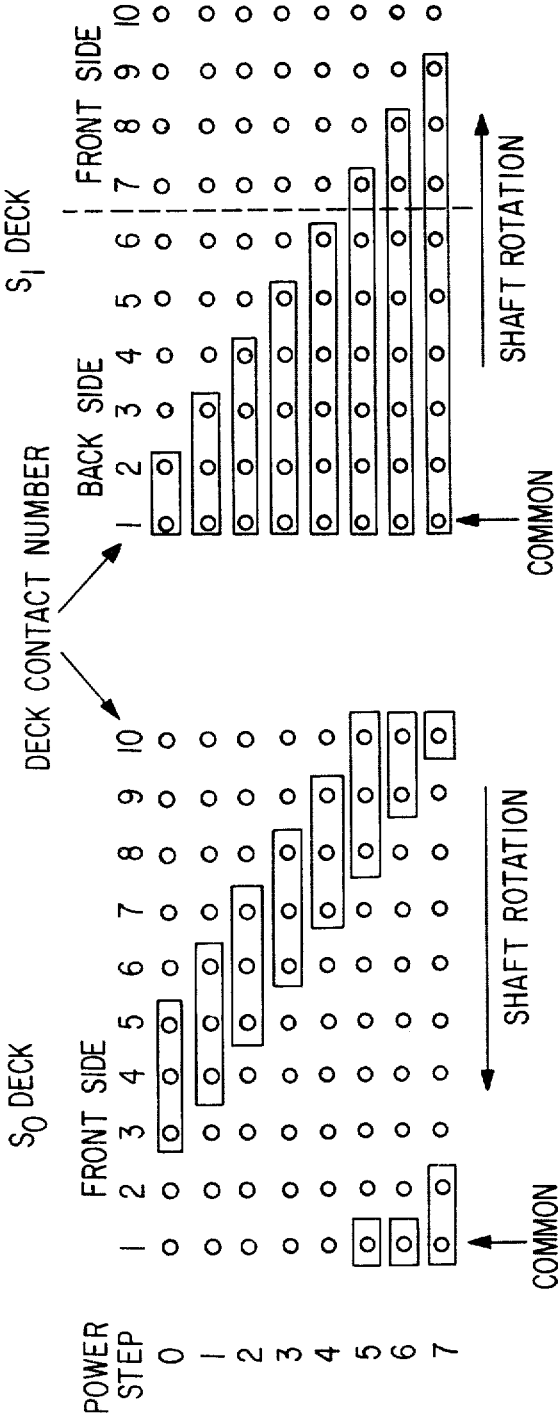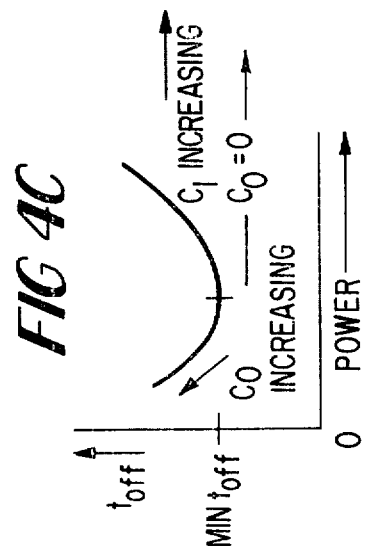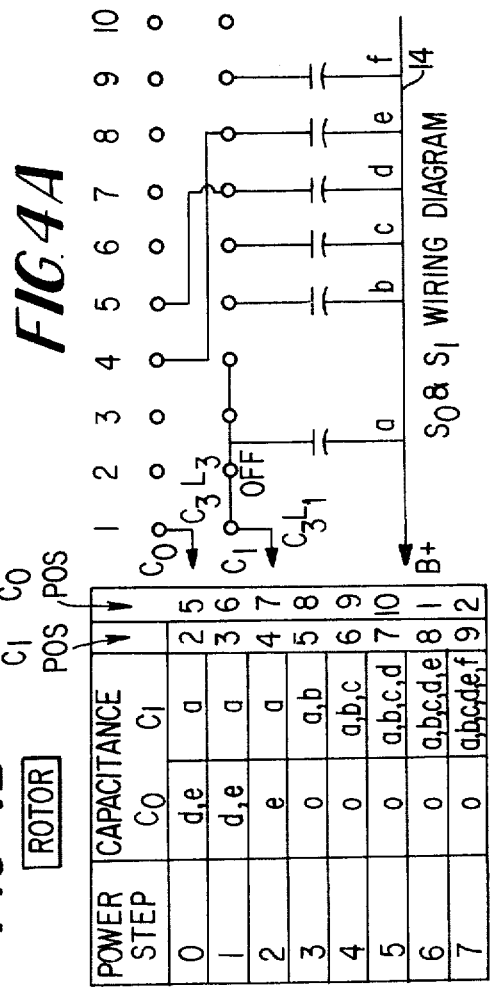
FIG. 4  FIG. 4A  FIG. 4B  FIG. 4C

3,886,342

INDUCTION COOKING UNIT HAVING ALL PAN SAFE OPERATION, WIDE RANGE POWER CONTROL AND LOW START-UP AND SHUT-DOWN TRANSIENTS

BACKGROUND OF THE INVENTION

Field of Invention

This invention relates to a new and improved induction cooking unit capable of safe operation with metal base pans of all types having a wide range control of the power level at which the induction cooking unit operates.

More particularly, the invention relates to an improved induction cooking unit of the type intended for use with kitchen ranges having a cool insulating top surface. At least one pancake-shaped planar induction heating coil is disposed below the insulating surface and produces magnetic lines of flux that are coupled to a pan or other metal base cooking vessel placed on the insulating surface over the coil. The coil is excited by high frequency currents supplied to the coil by an improved chopper inverter supply constructed in accordance with the present invention, and which makes it possible to operate safely metal-base cookware of all types including highly conductive aluminum, copper and other pans without endangering the induction cooking unit. Further the unit may be operated safely over a wide range of power levels including quite low power levels, of the order of one twenty-fourth of the maximum level of power available from the unit. U.S. No. No.8c 3,710,062 issued Jan. 9, 1973 for Metal Base Cookware Induction Heating Apparatus, etc., Philip H. Peters, Jr., Inventor, assigned to the Environment/One Corporation, of Schenectady, New York, describes an induction heating apparatus for metal base cookware. The apparatus utilizes a solid state silicon control rectifier chopper inverter circuit to electrically excite a pancake shaped, planar induction heating coil at comparatively high frequencies of the order of 20 kilohertz. The induction heating coil is disposed below a cooktop smooth insulating surface on which metal base cookware to be heated is placed. Magnetic lines of flux produced by the induction heating coil are tightly coupled to and generate heat in the metal base cookware. Due to the periodic build-up and collapse of the magnetic lines of flux at a relatively high rate of 20 Kilohertz, high frequency currents are induced in the surface of metal base cookware. Because of the high surface resistivity of the metal base cookware at this high frequency, relatively efficient heating of the metal base cookware is achieved.

While the induction heating apparatus disclosed and claimed in U.S. Pat. No. 3,710,062 is satisfactory in many respects, it is desirable that the apparatus be capable of being safely operated with all types of metal base cookware such as highly conductive pans of aluminum, copper, etc., that the rf power produced by the apparatus be capable of being controlled over a wide range of power including very low power levels; and that soft starting and shut-down of the induction heating unit to minimize high transient voltages and currents be incorporated in an induction heating apparatus that is relatively simple and inexpensive to manufacture and reliable in operation, and easy to maintain.

SUMMARY OF THE INVENTION

A primary object of the present invention is to provide a new and improved induction cooking unit which is capable of all pan operation and which includes a pan safety control feature that allows the unit to be operated safely with aluminum, copper or other highly conductive pans that inadvertently may be used by a housewife or other operator of the unit.

Another feature of the invention is the provision of a new and improved induction heating unit which is capable of operation over a very wide range of power levels including quite low power levels while still providing adequate commutating time intervals for the thyristor used in the inverter circuit to excite the induction heating coil which are within the rate of recovery time of the thyristor.

A still further feature of the invention is the provision of the new and improved induction heating unit having the above characteristics which is capable of operation with a minimum stressing of circuit components with voltage and high transients.

In practicing the invention, a new and improved induction heating unit is provided which includes inverter circuit means comprised by a gate control thyristor and a commutation circuit coupled together in circuit relationship and excited from a set of power supply terminals that are designed for connection to a source of excitation potential that may comprise a conventional residential, commercial or industrial source of alternating current. An induction heating coil is coupled to and excited by the inverter circuit in a manner such that the loading and unloading of the induction heating coil determines at least in part the frequency at which the inverter circuit means operates. Gating circuit means are coupled to and control turn-on of the gate controlled thyristor comprising a part of the inverter circuit means and comprises a feedback sensing circuit means coupled to the induction heating coil for deriving a feedback trigger signal that is synchronized with changes in the resonant frequency of the commutation network. The gating circuit means further includes a gating signal pulse generator for generating high frequency signal pulses having a repetition rate determined by a desired operating frequency for the chopper-inverter circuit and of sufficient energy to insure turn-on of the gate control thyristor. Enabling means are coupled to and enable initiation of operation of the gating signal pulse generator and is responsive to an alternating signal coupling circuit means comprising a differentiating network which intercouples the last mentioned enabling means with the feedback sensing circuit for synchronizing operation of the gating signal pulse generator with changes in the resonant frequency of the commutating network of the inverter circuit due to loading and unloading of the induction heating coil.

Wide range control over the power output level of the inverter circuit means including operation at low power level, is achieved by switching means for a plurality of commutating capacitor elements that comprise the serially connected commutating capacitor reactive component connected in series circuit relationship with an inductor reactive component to form the commutation circuit for the inverter. The gate controlled thyristor is connected in parallel circuit relationship across the serially connected capacitor and inductor commutating reactive components. The capacitor commutating element switching means is provided for connecting different values of commutating capacitance in operating circuit relationship in the commutation circuit means to thereby control the output power level generated by the circuit. Shunt capacitor means are provided along with shunt capacitor switching means for switching certain ones of the commutating capacitor elements in shunt circuit relationship across at least a part of the inductor reactive component at low power levels whereby the shunt capacitor components share current flowing through the inverter with the inductor component coupled to the pan load at low power levels. This results in reducing the effective inductance of the inductive reactive component and increasing the effective capacitance of the capacitor reactive component so as not to reduce the circuit commutating turn-off time below a value which is less than the rated recovery time for the gate control thyristor used in the circuit.

Start-up and shut-down transients in the induction heating unit are kept to a minimum in a low cost construction by the provision of zero point pulse generator means coupled to the power supply terminals for producing an enabling output pulsed signal at the occurrence of each zero point in the periodic undulating excitation potential supplied to the inverter circuit means. Zero point coincidence circuit means are coupled and control operation of the gating signal generator in response to the output from the zero point pulse generator means so as to condition the circuit for turn on as well as turn off of the gating signal generator means only at or near the periodic zero points in the periodic undulating excitation potential.

These and other objects, features and advantages of the invention, will be appreciated more readily as the same becomes better understood by reference to the following detailed description when considered in connection with the accompanying drawings, wherein like parts in each of the several figures are identified with the same reference character; and wherein:

BRIEF DESCRIPTION OF THE DRAWINGS

FIG. 2A is a functional schematic sketch showing a preferred construction for the pancake-shaped heating coil disposed below a smooth and cool cooktop insulating surface and on which a pan or other metal base cooking vessel is disposed during cooking operations;

FIG. 3(a) through FIG. 3(g) comprise a series of voltage wave from versus time characteristic curves illustrating the manner of operation of the circuit shown in FIG. 2 at several points in the circuit;

FIGS. 4, 4A, 4B and 4C are functional schematic sketches showing the construction of the capacitor commutating reactive components and the switching assembly employed to selectively connect such components in the circuit shown in FIG. 2 to achieve wide range power control;

DETAILED DESCRIPTION OF THE DRAWINGS

Figure 1:
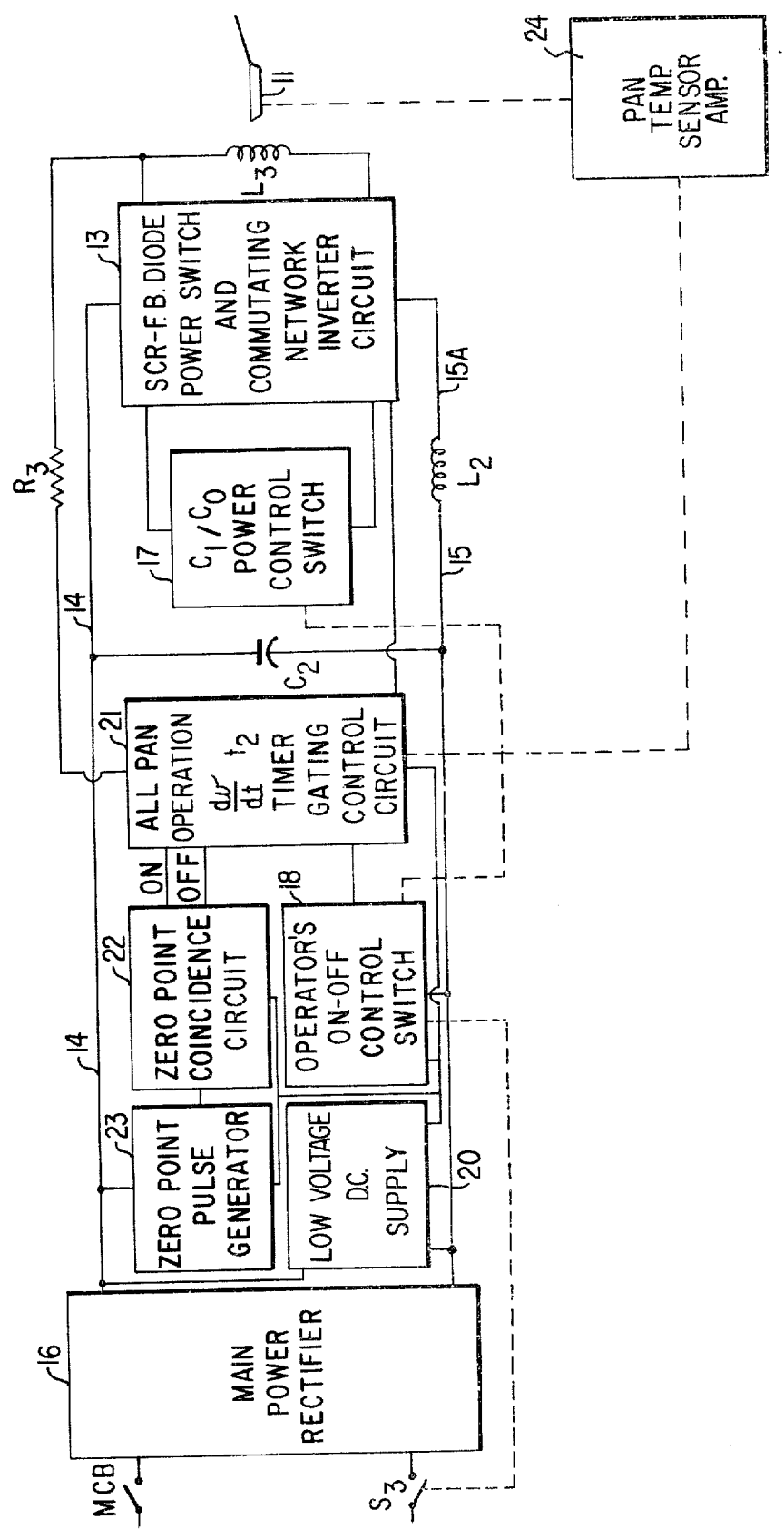
FIG. 1 is a functional block diagram of a new and improved induction heating unit constructed in accordance with the invention.

FIG. 1 is a functional block diagram of a preferred form of a new and improved induction heating unit constructed in accordance with the invention. In FIG. 1, an induction heating coil L3 is shown at the right hand side of the drawing, and upon excitation its near induced field can be magnetically coupled to a pan 11 thereby causing the pan to be heated. A preferred physical construction for the induction heating coil L3 is shown in FIG. 2A of the drawings wherein it is seen that the coil L3 consists of one spirally wound coil or several such coils stacked one above the other to form a planar pancake. The coil L3 is disposed under an insulated cool top surface 12 which physically supports the pan 11. The undersurface of the insulating cool top surface (12) is provided with a thin conductive coating or film (ESI) formed thereon by any suitable technique which is electrically grounded for high radio frequencies. The conductive coating (ESI) thus forms an electrostatic shield means for preventing the build up of electrostatic charges on the cool top insulating surface due to electrostatic coupling at the high radio frequencies at which the power inverter operates. The desirability and benefits of a cooking range utilizing such an induction heating coil and electrostatic shield arrangement are described more fully in the above referenced U.S. Pat. No. 3,710,062, and in copending U.S. application Ser. No. 263,639, and hence will not be repeated in detail.

The induction heating coil L3 is excited from an inverter circuit means 13 that in turn is coupled to and excited from a pair of power supply terminals 14 and 15 that in turn are adapted to be connected a source of excitation potential. The source of excitation potenial comprises a main power rectifier 16 that is designed to be connected to a conventional source of industrial, commercial or residential alternating current through a fast acting magnetic circuit breaker MCB and operator control switch S3. The main power rectifier 16 preferably comprises a full wave rectifier that supplies a full wave rectified potential across the power supply terminals 14 and 15 to the chopper inverter circuit means 13 whose construction will be described more fully hereinafter. Filtering of the high frequency component appearing between the power supply terminals 14 and 15A is achieved with the filter and inverter charging inductor L2 in conjunction with filter-capacitor C2 connected across terminals 14 and 15. The full wave rectified 120 hertz potential of main power rectifier 16 appearing across terminals 14 and 15 also is filtered somewhat (semifiltered) by the C2 filter capacitor.

The inter-relationship of the L2 inductor and the C2 filter capacitor and their role in the operation of the inverter circuit with a semi-filtered dc supply is described more fully in the above referenced U.S. Pat. No. 3,710,062.

Power control of the output power generated by the inverter circuit means 13 is achieved by C1/Co power control switch means 17 that is ganged to operate in conjunction with an operator's on-off control switch 18, as indicated by the dotted line connection 19. Upon appropriate setting of the C1/C0 power control switch 17, and turn on of the inverter circuit means 13, the inverter will thereafter operate in the normal manner of a series commutated chopper inverter to produce output power pulses of current having a frequency of the order of 20 kilohertz which are supplied to the induction heating coil L3. For a more detailed description of the construction and operation of the inverter circuit means 13, reference is made to the above-noted U.S. Pat. No. 3,710,062, the disclosure of which hereby is expressly incorporated by reference. Briefly, however, it can be stated that upon the silicon control rectifier thyristor comprising a part of the inverter circuit means being gated on, the circuit automatically will discharge and then recharge a commutating capacitor with current flowing through the induction heating coil L3, and thereafter will commutate (turn off) the thyristor. Repeated turn on and turn off of the thyristor in this manner operates to produce the high frequency output pulses of current that are used to excite a current flow the induction heating coil L3 at the 20 kilohertz rate.

Gating-on of the thyristor in the inverter circuit 13 is controlled by an all pan $dv/dt$ $t_2$ timing gating control circuit 21 which in turn is controlled at least in part by the operators on off control switch 18. The $dv/dt$ $t_2$ timer 21 is itself excited from a low voltage direct current supply shown at 20 which may derive its power from the main power terminals 14 and 15 connected across the output from the main power rectifier 16. Alternatively, the low voltage dc supply 20 may be provided by the alternating current source from the line side of rectifier 16 via a separate small transformer and rectifier arrangement in a conventional well known manner.

In operation the $dv/dt$ $t_2$ timer produces gating on signal pulses having a repetition rate related to the no load operating frequency of the inverter circuit 13. As will be explained more fully hereinafter, the loading and unloading of the L3 induction heating coil by the presence or absence of pan 11 will affect the operating frequency of the inverter commutation circuit. In the case of highly conductive pans fabricated from aluminum, copper, alloys of such materials and the like, the effect of the pan load is such that the commutating frequency of the inverter circuit is raised to a much higher value than it otherwise would be in the absence of a load, or in the presence of a suitable, or proper load such as a pan of iron, stainless steel or other lossy metal base cooking vessel. In order to follow changes in the commutating frequency of the commutating circuit due to loading and unloading, feedback circuit means in the form of a feedback resistor network including resistor R3, is connected across the L3 induction heating coil, and supplies a synchronizing signal back to the $dv/dt$ $t_2$ timer gating control circuit 21 to lock its frequency of operation with the instantaneous operating frequency of the commutating circuit as is determined by its loading condition. As a result, changes in the commutating frequency of the commutation circuit due to loading and unloading of the L3 induction heating coil will not result in misfiring of the thyristor by the gating circuit with consequent improper operation of the inverter circuit as will be appreciated more fully following a reading of the detailed description of FIG. 2 of the drawings.

In addition to the measure of control provided by the operators on-off control switch 18, and the synchronizing signal from feedback resistor R3, the $dv/dt$ $t_2$ timer gating control circuit 21 also is controlled by the output from a zero point coincidence circuit 22 that in turn is controlled by the output from a zero point sensing and pulse generator circuit 23. The zero point pulse generator circuit 23 is connected to the main power rectifier 16, and produces a timing signal pulse upon the occurrence of the each substantial zero point in the full wave rectified output potential appearing across the main power supply terminals 14 and 15. The zero point timing signal pulse is supplied to a zero point coincidence circuit 22 which operates to condition the circuit for turn-on or turn-off of the $dv/dt$ $t_2$ timer gating control circuit 21 only at or near substantial zero points of the undulating full wave rectified excitation potential appearing across the power supply terminals 14 and 15. By this means, the high frequency chopper inverter circuit means 13, is allowed to turn-on or turn-off only at or near the substantial zero points of the full wave rectified undulating excitation potential appearing across main power supply terminals 14 and 15 thereby reducing to a minimum high voltage and a high current start-up and turn-off transients normally produced during start-up and turn-off of the circuit.

In addition to the above features, a more sophisticated cooking range may include a pan temperature sensor and amplifier control circuit 24. The pan temperature sensor employs an infra red temperature sensor which views the bottom of pan 11 and thereafter operates to control turn-on and turn-off of the $dv/dt$ $t_2$ timer gating control circuit 21 whereby pan 11 may be maintained at some desired preset temperature level. For a more detailed description of the sensor amplifier 24, reference is made to U.S. Pat. No. 3,710,062 and to FIG. 6A described hereinafter.

In operation, after the circuit of FIG. 1 is turned-on by the housewife or other operator of the induction heating unit and set for achieving a desired amount of heating of the pan 11 as determined by the setting of the C1/C0 power control switch 17, at which point the line switch S3 and operators on-off control switch 18 have been closed in the sequence named to commence operation of the circuit. It is assumed that the circuit breaker MCB stays closed unless tripped by a fault. The fact of closure of the operators on-off control switch 18 is not of itself sufficient to initiate operation of the inverter circuit 13 for that can not occur until such time that a zero point is detected by the zero point pulse generator 23. Upon this occurrence the zero point coincidence circuit 22 conditions $dv/dt$ $t_2$ timer gating control circuit 21 to initiate operation. Thereafter the gating control circuit 21 will generate output gating pulses at a frequency synchronized with the frequency of operation of the inverter circuit commutation network as determined by the loading and unloading on the L3 induction heating coil as described above.

Figure 2:
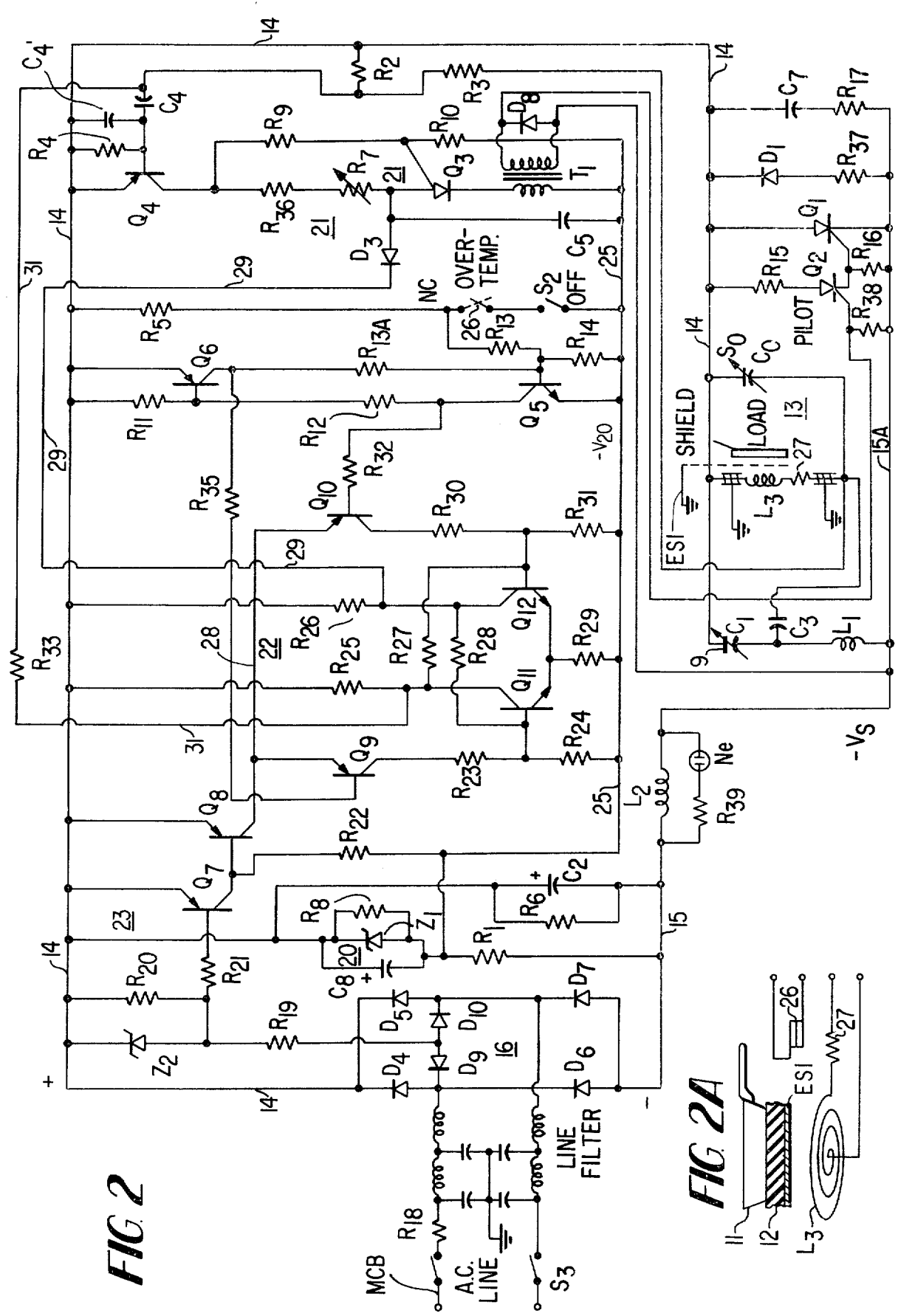
FIG. 2 is a detailed schematic circuit diagram of the new and improved induction heating unit shown schematically in FIG. 1.

While the $dv/dt$ $t_2$ timer gating control circuit 21 is precondition for operation by closure of the operators on-off control switch 18 with an appropriate presetting of the C1/C0 power control switch, actual operation does not take place until the occurrence of a zero point of the undulating full wave rectified excitation potential appearing across power supply terminals 14 and 15. By reason of this feature, start-up voltage and current transients are maintained at a minimum. By reason of the synchronized feedback through the feedback resistor R3 to control turn-on of the $dv/dt$ $t_2$ timer gating control circuit 21, proper and safe operation of the inverter circuit 13 under all conditions of loading and for all types of pans, is assured. Finally, the design of the C1/C0 power control switch 17 as described hereinafter provides a large range of power control of the output control produced by the inverter circuit 13 including very low levels of output power such as is required in cooking applications and yet allows safe operation of the inverter circuit over the full range of output power levels. improved FIG. 2 is a detailed schematic circuit diagram of the new and iproved induction heating unit constructed in accordance with the invention. In FIG. 2, it will be seen that the induction heating coil L3 is connected in series circuit relationship with a capacitor C3 with the series circuit thus comprised connected in parallel circuit relationship across a commutating capacitor C1. The commutating capacitor C1 in turn is connected in series circuit relationship with a commutating inductor L1 and the series circuit thus comprised is connected across the power supply terminals 14 and 15A. Power supply terminals 14 and 15A are supplied with the undulating, full wave rectified excitation potential supplied from the output of the main power rectifier 16 comprised by a diode bridge D4, D5, D6 and D7 connected in a conventional full wave rectifier bridge network. A power rated thyristor comprised by a silicon control rectifier (SCR) Q1 has its anode connected to the positive polarity power supply terminal 14 and its cathode connected to the negative polarity power supply terminal 15A. A feedback diode D1 is connected in reverse polarity, parallel circuit relationship with the SCR Q1. A suitable current sensing resistor R27 is connected in series with Coil L3. A conventional snubbing network comprised by a capacitor C7 and series connected resistor R17 is connected in parallel across the SCR Q1 and feedback diode D1. A pilot SCR Q2 is connected across the main power SCR Q1 through a current limiting resistor R15 and a common coupling resistor R16 that serves to transfer a gating-on pulse of sufficient magnitude to the control gate of Q1 to assure safe turn-on of Q1 even at very low levels of semi-filtered rectified supply potential across terminal 14 and 15A of the order of 10 volts.

In operation, upon the Q2 pilot SCR receiving a gating on pulse from the $dv/dt$ $t_2$ timer gating pulse generator 21 to be described hereinafter, Q2 turns on and couples a gating on pulse through the common load resistor R16 to the control gate of the main power thyristor Q1. It is assumed at this point in the operation, that the circuit breaker MCB has been closed as well as the S3 line switch and that excitation power from the full wave rectifier 16 is being supplied to power supply terminals 14 and 15. Under these conditions the commutating capacitor C1 (as well as the filter capacitor C3) will be charged substantially to the average rectified line voltage Vs of the power supply terminals 14 and 15. Ignore for the time being the shunt capacitor C0.

Upon gating on of the main power SCR Q1 the charge on the commutating capacitor C1 will be oscillated through the conducting SCR Q1 producing a current flow through the commutating inductor which at the end of one half $t_1$ cycle will cause the polarity of the charge on the commutating capacitor C1 to reverse. Thereafter, the reverse polarity charge on the commutating capacitor C1 will cause current to flow back through the inductor L1 and reverse connected feedback diode D1 to return the charge on capacitor C1 to substantially its initial polarity and charged condition minus any circuit losses due to loading, etc. During this reverse conduction interval through feedback diode D1, the reverse polarity across SCR Q1 will cause it to commutate off (turn off) so that upon completion of the oscillation and return of the C1 commutating capacitor to substantially its original charged condition, current flow through the D1 feedback diode will be blocked and the circuit will assume its original charged condition ready for another pulsed oscillation. It will be appreciated that the interval of time in which the feedback current flows back through the feedback diode D1 determines the amount of commutating turn off time available in which to turn off SCR Q1.

Because of its nature and design the SCR Q1 requires some predetermined minimum turn off time in order to assure that it will regain its current blocking capabilities well in advance of the forward potential appearing across the power supply terminals 14 and 15A being reapplied across it upon the feedback diode D1 ceasing conduction. Because of this requirement, the C0 shunt capacitor, and its appropriate switching circuitry S0 (described hereafter with relation to FIG. 4), has been included to assure adequate turn off time for the SCR Q1 while operating under low power output conditions as will be explained more fully hereinafter in connection with FIG. 4 of the drawings.

The above brief description of the chopper inverter circuit operation ignores the effect of the induction heating coil L3, which in conjunction with its series connected smoothing capacitor C3 functions also as a smoothing filter to produce an essentially sinusoidal wave form current flowing through the L3 induction heating coil as explained more fully in the above referenced U.S. Pat. No. 3,710,062. The value of inductance of the L3 induction heating coil and the value of capacitance of capacitor C3 are adjusted so that the reactance of the parallel network comprised by L3, C3 and C1 always remains capacitive in nature at any frequency at which the inverter oscillates. The frequency of oscillation of the charge on the C1 commutating capacitor is determined primarily by the net capacitance of the parallel combination of the capacitor C1 and the reflected capacitance of the L3 C3 C0 network in series with the inductance of L1. This frequency, known as the commutating frequency, is changed by loading and unloading of the L3 induction heating coil upon a pan 11 being brought into inductive relationship with L3 or removed from it. Hence, loading and unloading of the L3 induction heating coil results in changing the natural resonant frequency of the entire commutating network. To accommodate this change in resonant frequency of the commutating network due to loading and unloading in a relatively simple and inexpensive manner, the present invention was devised.

Briefly stated, dynamic changes in the resonant operating frequency of the commutating network caused by tuning and detuning of the L3 induction heating coil due to loading and unloading with a pan, are accommodated by appropriate synchronization of the operation of the gating pulse signal generator 21 with a synchronizing feedback signal.

Synchronization of the operation of the gating pulse signal generator 21 is achieved by means of a synchronizing feedback signal derived from a feedback circuit means comprised by a pair of sensing resistors R2 and R3 connected in series circuit relationship across the L3 induction heating coil. The junction of the sensing resistors R2 and R3 is coupled through alternating current signal coupling circuit means comprised by a capacitor C4 coupled to the base electrode of an enabling switching transistor Q4. Capacitor C4 and mainly resistor R2 comprise a differentiating network for differentiating the synchronizing feedback signal VL3 derived from across the induction heating coil L3, and apply the differentiated signal to the base electrode of the switching transistor Q4. A biasing resistor R4 is connected between the base of Q4 and the power supply terminal 14 and a capacitor C4' is connected in parallel across the R4 biasing resistor and integrates so as to delay or prolong the turn-on period of conduction for the transistor Q4.

The switching transistor Q4 comprises an enabling means for enabling operation of the gating pulse generator signal 21. Gating pulse signal generator 21 is comprised by a programable unijunction transistor Q3 (hereinafter referred to as a PUT). PUT Q3 has its anode connected through a variable resistor R7 and a fixed resistor R36 to the collector of PNP enabling switching transistor Q4 whose emitter is connected to positive power supply terminal 14. The cathode of PUT Q3 is connected through the primary winding of a pulse transformer T1 to the negative terminal 25 of a −20 volt low voltage direct current power supply 20.

The low voltage direct current power supply 20 is comprised by a zener diode Z1 having a filter capacitor C8 and filter resistor R8 connected in parallel across it with the circuit thus comprised being connected in series circuit relationship with a voltage dividing resistor R1 across the main power supply terminals 14 and 15. As a consequence of this arrangement, as voltage builds up on the main power supply terminals 14 and 15, a corresponding self derived direct current low voltage of 20 volts will be produced across the low voltage power supply terminal 25 relative to the main power supply terminal 14. This low voltage 20 volt direct current supply provides excitation potential for all of the gating subcircuits comprising a part of the induction heating unit. It is believed obvious to one skilled in the art that a separate low voltage direct current supply could be provided by means of a separate ac transformer and rectifier arrangement connected to the input ac supply.

The gating pulse generator 21 is further comprised by a timing capacitor C5 which is connected in parallel circuit relationship with PUT Q3 and primary winding of transformer T1 and in series with the resistor R7 and fixed resistor R36. A pair of biasing resistors R9 and R10 are connected in series circuit relationship across the serially connected resistors R7 and R36 and PUT Q3 with the juncture of the biasing resistors R9 and R10 being connected to the anode gate of PUT Q3. Upon switching transistor Q4 being turned on, timing capacitor C5 will be charged positively from the 20 volt supply through resistors R36 and R7 at a rate determined by the overall time constant of C5 and resistors R36 and R7. This rate is adjustable through the medium of variable resistor R7. Assuming no other interaction or interruption of the charging of timing capacitor C5, charging of C5 will continue until it will reach a value where it will cause PUT Q3 to breakdown and conduct at a charging level determined by the value of the biasing potential supplied to the anode gate of PUT Q3 from the biasing resistors R9 and R10.

FIG. 3($g$) of the drawings illustrates the buildup of charge on timing capacitor C5 under conditions that provide an overall $t_2'$ time at the end of which a gating pulse will be produced across the primary winding of pulse transformer T1. The gating pulse is supplied by the secondary winding of T1 across load resistor R38 and applied to the gating electrode of the Q2 pilot SCR thereby to initiate one oscillation of the chopper inverter circuit as described previously. At this point in the description it would be good to note that as the charge on the timing capacitor C5 builds up towards its ultimate firing value determined by R9 and R10, should conduction of the enabling transistor Q4 be terminated, the biasing potential to the anode gate of PUT Q3 from biasing resistors R9 and R10 will disappear and PUT Q3 automatically will conduct to produce a gating on pulse at some intermediate point indicated at $t_2$ in FIG. 3($g$) of the drawings. Thus, it will be appreciated that control of the buildup of charge on the timing capacitor C5 by turn on and turn off of the enabling transistor Q4, provides control over the timing of production of the $t_2$ timing pulse and is exercised by turning off the enabling transistor Q4 at some intermediate point short of the full $t_2'$ time determined by the RC time constant of C5 and R36, R7.

In order to control turn on and turn off of the induction heating unit an operators on off control switch S2 is provided. Switch S2 is operated only after a line switch S3 connected in the AC line side of the full wave rectifier power supply 16 has been closed through mechanical interconnection of the switches to provide power to the low voltage DC power supply 25. Switch S2 is ganged to and operates in conjunction with the C1/C0 capacitor switching arrangement S1 and S0 which will be described hereinafter. Switch S2 is connected in series circuit relationship with a normally closed contact of an over temperature limit switch 26 and with a resistor R5 across the low voltage DC power supply terminals 14, 25. The normally closed over temperature limit switch 26 may comprise a bi-metal temperature sensitive switch, PTC thermistor or other thermally sensitive element which is physically disposed adjacent to a current sensing resistor 27 connected in series circuit relationship with the induction heating coil L3. The current sensing resistor 27 will heat up in the presence of excessive current flow through the induction heating coil L3 and will cause the bimetal or other normally closed contacts to over temperature switch 26 to open to thereby interrupt operation of the induction heating unit in the same manner as will be described hereinafter when the S2 operators control switch is opened. Alternatively, the thermally sensitive element could be arranged to sense the temperature of the L3 induction heating coil, the temperature of the insulating counter top, or other part where minimum temperature levels during of operation are to be maintained.

Series resistor R5 is in effect part of the voltage dividing resistor network comprised by resistor R5, resistor R13 and resistor R14 the juncture of R5 and R13 being connected through normally closed switch contact 26 and the operators control switch S2 down to the negative terminal 25 of the low voltage direct current power supply. The juncture of resistors R13 and R14 is connected to the base electrode of an NPN switching transistor Q5 having its emitter connected to the power supply terminal 25 and having its collector connected in series circuit relationship with a pair of limiting resistors R11 and R12 to the power supply terminal 14. The juncture of resistors R11 and R12 is connected to the base electrode of a PNP switching transistor Q6 whose emitter is connected to the power supply terminal 14 and whose collector is connected through a limiting resistor R13A back to the base of the NPN switching transistor Q5. Thus it will be appreciated that the resistors Q5 and Q6 are connected in a hooked manner so that turn on of the transistor Q5 results in turn on of transistor Q6 which further feeds back to the base of Q5 and latches it on in a conducting condition. This positive latching on and off of Q5 and Q6 switching transistors locks out any transient voltage spikes that might be caused by erratic operation of the operator switch S2 and/or normally closed over temperature switch 26.

In the circuit of FIG. 2, closure of the on off operators switch S2 is not of itself sufficient to initiate operation of the induction heating unit chopper inverter 13 because of the inclusion of a zero point starting and stopping control in the arrangement. Zero point control over the operation of the chopper inverter is achieved by means of a zero point pulse generator shown generally at 23 and comprised by a zener diode Z2 connected between the power supply terminal 14 and through a limiting resistor R19 to the common connected anodes of a pair of diodes D9 and D10. Diodes D9 and D10 are connected across the diode rectifier bridge D4 through D7 in a manner so as to assure the absence of a potential across Zener diode Z2 and its corresponding load resistor R20 only upon the occurrence of the recurring zero point in the undulating, unidirectional, semifiltered full wave rectified excitation potential appearing across the output terminals of the full wave rectifier bridge D4 through D7. On either side of the recurring zero points, either D9 or D10 will be conductive and will result in the production of a negative polarity bias potential across Z2 and load resistor R20. This negative bias potential is supplied through limiting resistor R21 to the base electrode of a PNP switching transistor Q7. Transistor Q7 has its emitter connected directly to power supply terminal 14 and its collector connected through a limiting resistor R22 to the negative terminal 25 of the low voltage direct current power supply. The collector of Q7 also is connected to the base of a second PNP switching tansistor Q8 having its emitter connected to the power supply terminal 14 and having its collector connected to a common switching terminal 28 of the zero point pulse coincidence circuit 22.

In operation, on either side of the zero point of the full wave rectified excitation potential supplied across the main power supply terminals 14 and 15 as shown in FIG. 3(a), a bias potential will be developed across zener diode Z2 and load resistor R20 which keeps switching transistor Q7 turned on and conducting. With Q7 turned on a positive polarity bias potential will be applied to the base of the second switching transistor Q8 which maintains this transistor turned off. However, upon the occurrence of a zero point in the full wave rectified excitation potential, no bias potential appears across the Z2 zener diode and its load resistor R20 and Q7 turns off. Hence, Q8 is allowed to turn on due to a negative bias potential supplied to its base through a resistor R22 from the 20 volt negative terminal 25 of the low voltage direct current power supply 20 as shown in FIG. 3(b). (b).

The zero point pulse coincidence circuit 22 is comprised by a pair of PNP switching transistors Q9 and Q10 having their emitter electrodes connected in common to a switching terminal bus bar 28 that is excited only in response to the switching transistor Q8 being turned on. The emitters of switching transistors Q9 and Q10 are connected through the limiting resistors R23, R24 and R30 and R31 respectively, to the 20 volt low voltage direct current power supply terminal 25. The juncture of the emitter resistors R23 and R24 is connected to the base electrode of an NPN switching transistor Q11 having its emitter connected through a common cathode load resistor R29 to the low voltage power supply terminal 25. Common cathode load resistor R29 also is connected to the emitter of a second NPN switching transistor Q12 in a manner such that the transistors Q11 and Q12 comprise a bistable multivibrator having common cathode coupling and two stable states of operation. The collector Q11 is connected through a limiting resistor R25 to the main power supply terminal 14 and through a coupling resistor R27 back to the base of the Q12 transistor, and the collector of Q12 is connected through a limiting resistor R26 to the main power supply 14 and through a resistor R28 back to the base of the transistor Q11. The collector Q11 also is connected through a limiting resistor R33 to the junction of feedback sensing resistors R2 and R3 for a purpose to be described hereinafter.

From the above description it will be appreciated that when the latching transistor Q5 is turned on, the base of Q10 will be clamped through resistor 32 to the potential of the low voltage negative power supply terminal 25 thereby rendering transistor Q10 conductive. Simultaneously because of the latching turn on action through feedback to the base of Q6 by resistors R11 and R12, Q6 will be rendered conductive and will clamp the base of NPN transistor Q9 through resistor R35 to the positive polarity potential power supply terminal 14. Thus, it will be appreciated that positive switching action of the operation of transistors Q9 and Q10 is obtained in response to the conduction or non-conduction of the latching transistors Q5 and Q6. With transistor Q12 switched on, a lock out condition is imposed on the charging of the timing capacitor C5 due to capacitor C5 being clamped very near the potential of terminal 25 through a diode D3 and conductor 29 and the emitter collector of transistor Q12.

As described earlier, prior to operator control switch S2 being closed and with line switch S3 closed, transistors Q5 and Q6 are latched on in the conducting condition due to a positive polarity turn on potential applied to the base of Q5 by resistors R5, R13 and R14. Conduction through Q5 connects the base of switching transistor Q10 to the negative terminal 25 of the low voltage direct current power supply thereby condition Q10 for turn-on, and upon the occurrence of a zero point in the supply potential across power supply terminals 14 and 15, Q10 is allowed to conduct. Conduction through Q10 applies a positive polarity turn on potential to the base of Q12 rendering Q12 conductive and locking out or blocking conduction of Q9 and Q11 by reason of the common cathode coupling through resistor R29 and the feedback to the base of 29 from the collector of Q12. With Q12 conducting, timing capacitor C5 is clamped to the potential of terminal 25, and gating signal pulses cannot be generated for application to the control gate of pilot SCR Q2. Thus operation of the induction heating unit is inhibited.

Thereafter, should the operators on off switch S2 be closed by a housewife or other operator of the circuit, the base of Q5 will be driven negative toward the potential of terminal 25 causing Q5 to turn off and this in turn causes Q6 to turn off in the previously described manner. This results in applying a negative turn on signal to the base of transistor Q9 causing it to turn on at the next succeeding zero point. Turn on of Q9 under these conditions will apply a positive turn on potential to the base of Q11 to cause it to turn on and to turn-off Q12 due to the common cathode coupling through R29 as shown in FIGS. 3(c) and 3(d). Turn off of Q12 is assured due to Q10 being maintained off at the current zeros by reason of the positive polarity inhibit potential at its base with Q5 off. Turn-off of Q12 removes the clamp across the timing capacitor C5 through coupling diode D3 and conductor 29 thereby allowing C5 to charge and conditions the gating pulse generator to commence operation.

For some arbitrary period after the on off switch S2 has been closed the collector voltage of Q12 remains at the −20 volt level of low voltage DC power supply terminal 25 as shown in FIG. 3(c). However, upon the occurrence of the next successive zero point of the supply potential the collector voltage Vce of Q12 rises toward the potential of terminal 14 and conduction through Q12 ceases. At the same instant Q11 turns-on and the collector of Q11 drops to near the −20 volt level of DC power supply terminal 25 as shown in FIG. 3(d). This results in the production of an initial gating on signal pulse that is supplied through the resistor R33, conductor 31 and differentiating capacitor C4 to the base of the enabling transistor Q4. Turn on of Q4 results in the production of a gating on signal pulse from the $dv/dt\ t_2$ timer gating circuit 21 and is supplied through pulse transformer T1 to gate on pilot SCR Q2 and the main power SCR Q1 as described previously to initiate sustained chopper inverter oscillations.

FIG. 3(f) of the drawings illustrates schematically the nature and general wave shape of the high frequency oscillatory output of the chopper inverter appearing across the main SCR between terminals 14 and 15A and modulated with the envelope of the full wave rectifier excitation potential appearing across the main power supply terminals 14 and 15. The high frequency oscillatory output is produced as a result of the high frequency $t_2$ gating pulses shown in FIG. 3(e) and supplied to pilot SCR Q2 by the $dv/dt\ t2$ timer 21 through pulse transformer T1. FIG. 3(g) of the drawings illustrates the wave shape of the feedback synchronizing potential $VR_2$ appearing across the sensing resistor R2 at a point in time different from the wave shapes shown in FIGS. 3A through 3F and at a point in one oscillatory cycle where this voltage swings from negative to positive polarity and then back through the zero point to assume a negative polarity. This VR2 potential is substantially in phase with the potential VL3 of heating inductor L3, and is used to initiate the start of the $t_2$ charging time of capacitor C5. The positive going half cycle of the $VR_2$ potential shown in FIG. 3(g) corresponds to the conduction interval $t_1$ of the main SCR Q1 and power feedback diode D1. As the VR2 potential passes through zero and starts to go negative and a current is injected into the base of Q4 by the differentiating action of capacitor C4 causing Q4 to turn on and initiate the $t_2$ charging time as described previously. Thereafter, due to the smoothing action of the capacitor C4' and resistor R4, Q4 will be maintained on and conducting over the $t_2$ charging interval and timing capacitor C5 will be charged towards the positive polarity of the DC supply potential 25 in the manner indicated by the increasing ramp voltage marked VC5. If charging of C5 were determined only by the RC time constant of the circuit, C5 would be charged for the full period $t2'$ time indicated in dotted outline, form in FIG. 3(g). However, the VR2 voltage which tracks the voltage across the L3 induction heating coil will reach some maximum negative value and then starts toward zero in the positive going direction. Hence, the differentiated value of VR2 likewise will go positive so that the base of Q4 is driven positive relative to its emitter and Q4 will turn off sharply. Turn off of Q4 removes the inhibiting potential supplied to the anode gate of Q3 by voltage dividing resistors R9 and R10 so that at this point PUT Q3 fires and produces a gating on signal pulse which is synchronized exactly with the natural resonant frequency of the commutating network. It is this operating characteristic that gives the circuit its "frequency pushing" capability so that as tuning and detuning of the commutating network occurs due to placement and removal, of pan loads, synchronization of the gating pulses shown in FIG. 3(e) with changes in the natural resonant frequency of the commutating network is assured.

In the presence of an aluminum, copper or other highly conductive pan, the natural commutating frequency of the chopper inverter increases due to the effect the highly conductive pan has in lowering the inductance value of the induction heating coil L3. Consequently, the frequency of the synchronizing pulses appearing across the feedback sensing resistors R3 and R2 and coupled to the base of Q4 through differentiating capacitor C4, likewise will increase corresondingly to assure synchronization of the generation of the gating signal pulses with the changes in frequency due to such loading.

If as a consequence of this condition, current flow through the L3 induction heating coil becomes excessive, the excessive current will be sensed by the current sensing resistor 27 and thermally sensitive contacts 26 shown in FIG. 2A. Opening of thermally sensitive contacts 26 will turn off the induction heating unit for a short interval to allow the unit to cool in a manner to be described hereinafter and then turn back on automatically in a cyclic fashion.

In addition to assuring soft turn on of the induction cooking unit at substantially only the zero points of the undulating supply excitation potential appearing across power supply terminals 14 and 15 the zero point coincidence circuit 22 also functions to assure soft turn off of the unit upon an operator causing the operators on off switch S2 to be moved to the off or open position, or upon opening of the thermally sensitive over temperature contact 26. Additionally, should a pan temperature and sensor amplifier unit 24 shown in block diagram form in FIG. 1 call for turn off of the induction heating unit for pan temperature controlling purposes, such turn off can be made to occur at only the substantial zero points of the undulating supply excitation potential appearing across terminals 14 and 15. This zero point turn off is achieved by means of the clamp placed across the timing capacitor C5 of the $dv/dt$ $t_2$ timer gating control circuit 21 through diode D3.

Assume that the induction cooking unit has been operating for some time and that the housewife operator causes the on off switch S2 to be moved to its off position. Upon this occurrence, a positive polarity turn on potential is applied to the base of transistor Q5 causing Q5 and its latching transistor Q6 to turn on and latch on in the conducting condition. It will be noted in FIG. 2 that the collector of Q5 is connected through resistor R32 to the base of transistor Q10 and the collector of Q6 is connected through R35 to the base of transistor Q9 of the zero point coincidence circuit 22. Thus, it will be seen that upon Q5 and Q6 being rendered conductive upon opening of switch S2, Q9 is conditioned to conduct. However, assuming that opening of the S2 switch occurs at some intermediate supply voltage level between the zero points of the undulating supply excitation potential appearing across power supply terminals 14 and 15, then Q9 and Q10 cannot conduct due to the lack of an enabling potential on their emitter electrodes. However, upon the occurrence of the next successive zero point, the zero point pulse generator 23 will turn on transistor Q8 thereby allowing transistor Q10 to turn on while transistor Q9 is maintained off due to the positive polarity bias potential supplied to its base by Q6. This results in causing the bistable multivibrator comprised by Q11 and Q12 to be switched whereby Q12 is conducting and Q11 is maintained off by reason of the common cathode coupling through the resistor R29. With transistor Q12 conducting, a clamp will be maintained across the timing capacitor C5 in the gate pulse generator 21 through diode D3 whereby preventing the gating pulse generator from producing gating on pulses. Since this occurs at only the substantial zero points in the undulating excitation supply potential appearing across power supply terminals 14 and 15, soft turn off of the chopper inverter circuit is assured thereby reducing to a minimum high transient voltages and currents through the circuit components during the shutdown process.

FIGS. 4, 4A, 4B and 4C illustrate in greater detail a preferred construction for the power controlling capacitor switching arrangement used with the chopper inverter circuit. It should be noted that while the capacitor switching arrangement herein described is preferred for power controlling purposes, other arrangements such as using a separate variable inductor L3' in series with the induction cooking coil L3, could be used satisfactorily for power control purposes. FIG. 4A of the drawings illustrates a plurality of capacitor elements $a, b, c, d, e, f$, which are connected to a common B+ power supply terminal that in fact with the circuit of FIG. 2 could constitute the power supply terminal 14. The upper end of the capacitor elements are shown connected to a row of contact points numbered 1 through 10 which constitute one set of fixed contacts points of a two deck rotary switch of conventional, commercial construction. FIG. 4 of the drawings is a schematic illustration of the manner in which the wiper contacts of the two deck rotary switch make contact with and electrically connect together the various fixed contacts in each of the S0 and S1 switching decks, respectively, of the two element rotary switch. From a consideration of FIG. 4, it will be seen that at the zero power level setting, the S0 deck serves to connect in circuit relationship the various capacitor elements ($a$) through ($f$) so that these capacitor elements comprise a desired amount of capacitance for the C0 shunting capacitor for each operating condition of the circuit. Similarly, the S1 switching deck connects in appropriate numbers of the capacitor elements ($a$) through ($f$) so as to comprise a predetermined amount of C1 commutating capacitance at a particular desired power output level. FIG. 4B of the drawings constitutes a table listing which ones of the capacitor elements ($a$) through ($f$) are connected in circuit relationship through their associated S0 and S1 switching decks in order to comprise the required amount of either C0 shunt capacitance or C1 commutating capacitance. From FIG. 4B, it will be seen that for power step (1) capacitor elements ($d$) and ($e$) will be connected in circuit relationship through the S0 switching deck to form a desired amount of shunt capacitance C0 and capacitor element ($a$) will be connected through the S1 switching deck to form the C1 commutating capacitance.

FIG. 4C of the drawings is an operating characteristic curve illustrating the operating characteristics of the power controlling circuit depicted in FIG. 2 of the drawings which include the C0 and C1 capacitor switching circuit arrangement of FIGS. 4 and 4A. In FIG. 4C power output level is plotted against the turn off time $t_{off}$ of the main power thyristor Q1 used in the chopper inverter circuit 13. As shown in FIG. 4C there is a minimum value of turn off time indicated as MIN $t_{off}$ below which it is not safe to operate the chopper inverter due to the fact that insufficient off time will provide to assure safe recombination of the current carriers in the main power controlling thyristor Q1 so that it safely will regain its current blocking capabilities intermediate each conduction interval. It is seen that this MIN $t_{off}$ time occurs at the nadir of the essentially U-shape characteristic curve wherein for increasing values of commutating capacitance C1, power output increases going from left to right from the nadir point; and that for increasing values of C0 shunt capacitance going from right to left from the nadir point and decreasing values of power towards zero, the $t_{off}$ time of the circuit increases with increasing C0 values. Hence, it will be seen that a wide range of power control level can be provided with a minimum number of capacitor elements wherein the capacitor elements through an appropriate switching scheme can comprise either the C0 shunt capacitance or the C1 commutating capacitance depending upon the setting of the switching arrangement. Accordingly, wide range control of power output level is achieved with a relatively simple and low cost capacitor bank and switching arrangement requiring a minimum number of capacitor elements.

Figure 5:
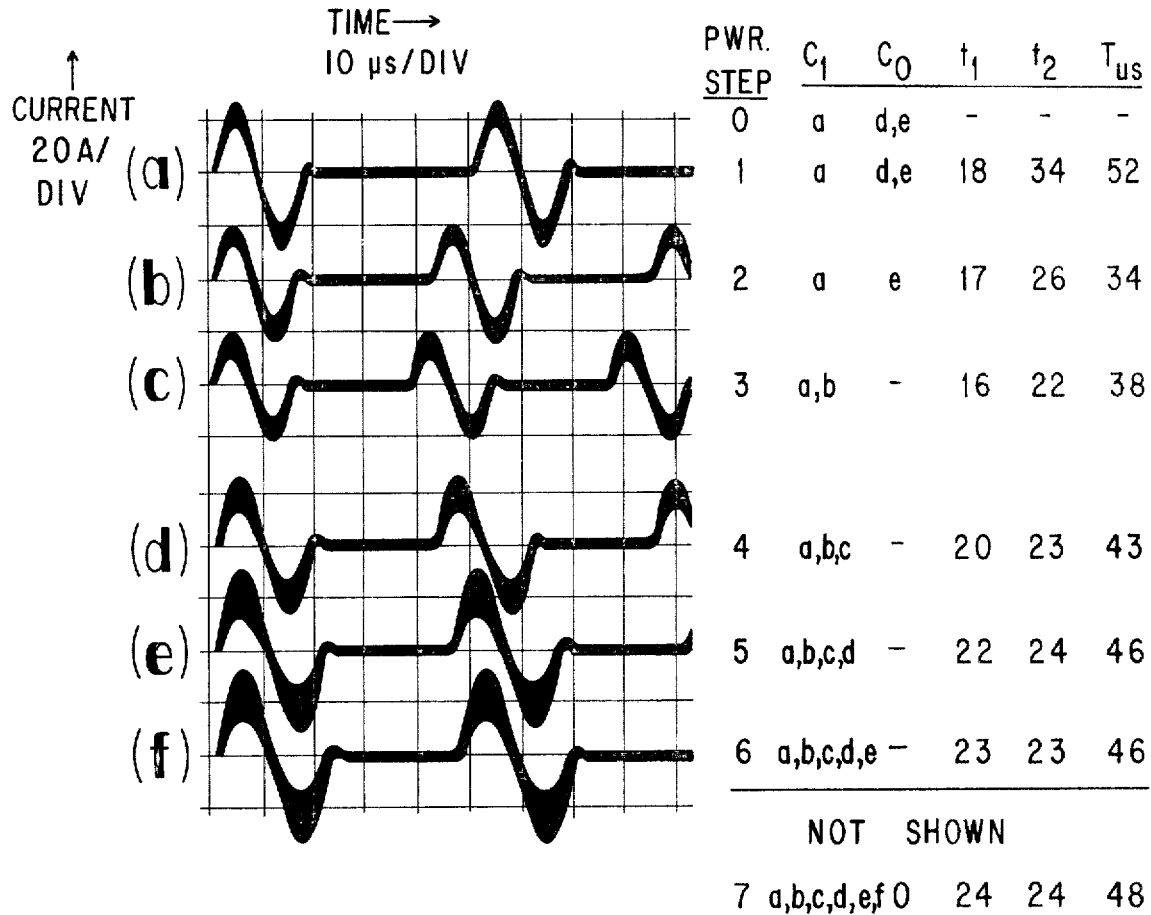
FIG. 5(a) through 5(f) comprise characteristic wave shapes illustrating the current through the thyristor power control device for various settings of the power control switching element shown in FIGS. 4A through 4C.

FIG. 5 of the drawings is a series of current versus time characteristic wave shapes illustrating the thyristor SCR and diode current flowing through the chopper inverter SCR and diode pair for each of the different power levels listed in the chart shown in FIG. 4B of the drawings. In these characteristic wave shapes, time is plotted as the abscissa with each division block representing 10 microseconds and current is plotted as the ordinate with each division mark representing about 28 amperes per division. To the right of each of the current versus time wave shapes the corresponding C1 commutating capacitance and C0 shunt capacitance values are listed together with the resulting $t_1$ and $t_2$ operating periods that result from the particular C1 commutating capacitance and C0 capacitance values switched into operating circuit relationship through appropriate setting of the S1 and C0 switch decks. From a consideration of these values, as well as by observation of the characteristic wave shapes, it will be appreciated that the power that can be delivered by the circuit to the pan load by the induction heating coil increases for increasing values of commutating capacitance C1.

Figure 6:
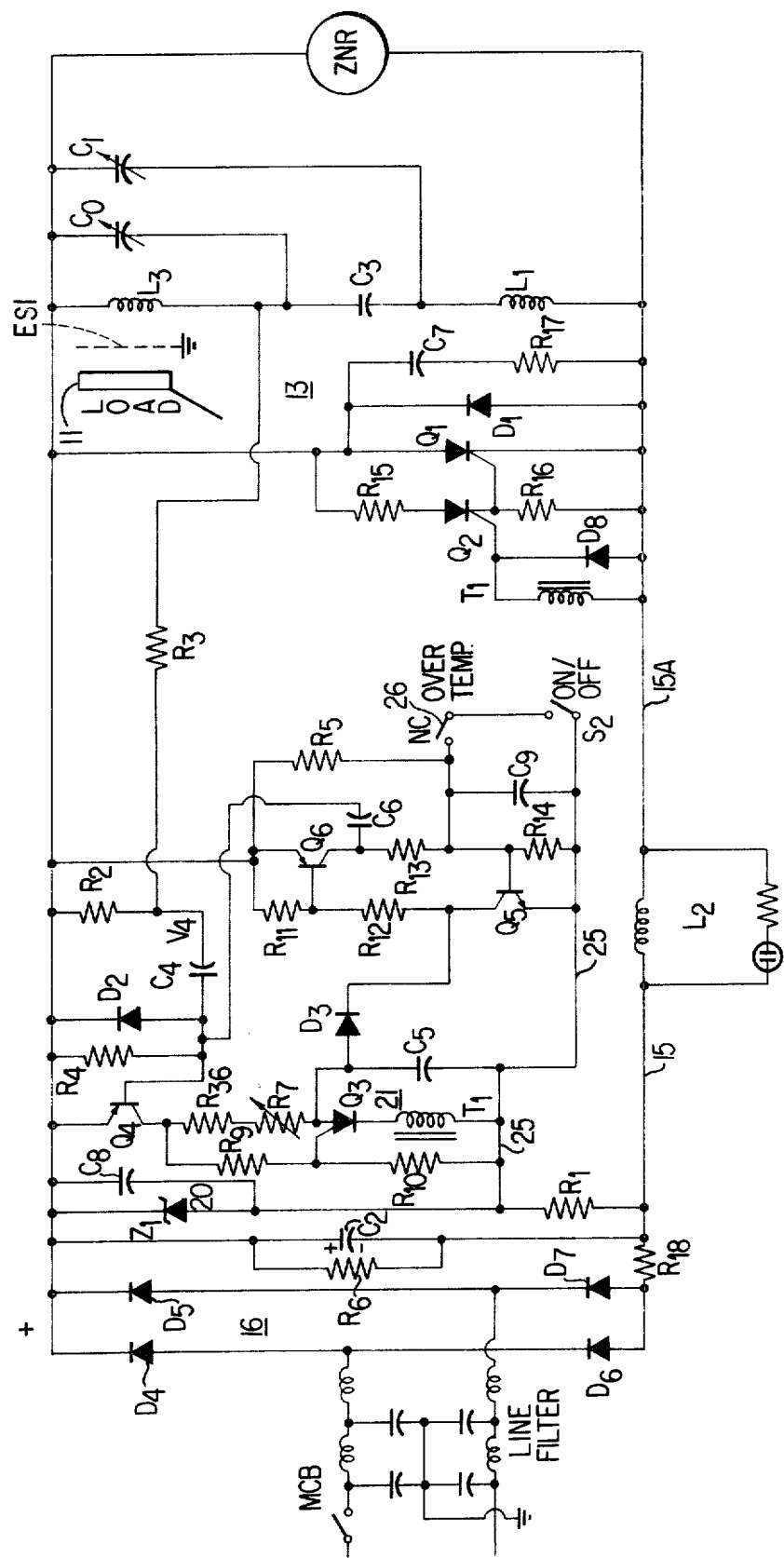
FIG. 6 is a detailed schematic circuit diagram of a low cost version of the improved induction heating unit circuit which does not employ zero point starting and turnoff.

FIG. 6 is a detailed schematic circuit diagram of a lower cost version of a new and improved induction cooking unit constructed in accordance with the invention and which does not include the zero point soft turn on and turn off characteristic of the FIG. 2 circuit. Accordingly, the circuit in FIG. 6 will exhibit higher levels of start and shut down voltage and current transients; however, in certain applications, this characteristic is not objectional. For such applications, the lower cost circuit of FIG. 6 is preferred.

Many of the components of FIG. 6 correspond to the same numbered elements of the FIG. 2 circuit, and hence have been identified by the same reference character. Accordingly, it is not believed necessary to describe in detail the common similar parts of circuit construction in the belief that the following description of operation will suffice to point out the distinctions of FIG. 6 over the FIG. 2 circuit. To begin with, the operators on-off switch S2 normally will be in the open condition shown so that a positive polarity turn on potential is supplied through resistors R5 and R14 to the base of the Q5 switching transistor. Q5 and Q6 have their bases interconnected so that upon Q5 being turned on, both Q5 and Q6 latch on in the same manner as was described with reference to FIG. 2. Upon Q5 being turned on, no voltage can be built up across the C5 timing capacitor of the gating pulse generator 21 due the clamp imposed across the timing capacitor through the diode D3 and Q5 in the conducting condition. Hence, the circuit is maintained in a clamped off condition. Upon the operators on off switch S2 being closed, the base of Q5 is placed at the $-20$ volt potential level of the low voltage direct current power supply terminal 25 and Q5 will be maintained off. This will result in turning off Q6 so that both Q5 and Q6 are latched off, and will remove the clamp from across the C5 timing capacitor in the gating pulse generator.

Upon the latching transistor Q6 being turned off, its collector will assume rapidly the negative potential of terminal 25 so that a negative going turn on pulse will be coupled through a capacitor C6 to the base of the enabling transistor Q4 causing Q4 to turn on and initiating the production of an initial gating on pulse from the gating pulse generator 21. This initial gating pulse will be coupled through the pulse transformer T1 having its primary connected in the cathode circuit of the PUT Q3 and its secondary connected to the gating electrode of the pilot SCR Q2. This results in gating on the main power control SCR Q1 and initiating oscillation of the chopper inverter as described previously with reference to FIG. 2.

As the chopper inverter circuit 13 oscillates through one cycle of operation, the voltage appearing across the L3 induction heating coil will be sensed and fed back by the feedback voltage dividing resistors R2 and R3 and supplied through differentiating capacitor C4 to the base of Q4 in the manner described above with reference to FIG. 2. Consequently, the generation of gating pulses by the $dv/dt\ t_2$ gating pulse generator 21, will be sustained thereby causing operation of the chopper inverter circuit 13 to continue in the manner previously described. As loading and unloading of the L3 induction heating coil occurs due to the placement and removal of a pan load 11, changes in commutating frequency due to tuning and detuning of the L3 induction heating coil will again change the frequency or repetition rate of the gating pulses being generated by the gating pulse generator circuit 21 to thereby cause the circuit to exhibit the above-described desired "frequency pushing" characteristic that is necessary to allow it to be used safely with all types of pans including highly conductive pans of copper, aluminum, and the like. Changes in output power levels of the circuit can be achieved with C0 and C1 switching arrangements similar to that described in reference to FIG. 4 of the drawings although other types of power control are possible. It should be noted that when switching from one power level to the next, there is a mechanical or other type of interconnection between the S0 and S1 switch contacts and the S2 operators on off switch, so that oscillations of the inverter are stopped during each switching operation. In this way, arcing and deterioration of the S0/S1 switch contacts is prevented by not allowing the switching to occur when high frequency, high voltage currents are flowing. For a more complete description of the construction of a suitable switch whereby an interlocking switching characteristic is achieved reference is made to the above-identified U.S. Pat. No. 3,710,062.

It should be noted from the above description, that the point in the supply voltage cycle where the gating generator 21 is enabled to initiate operation of the main Q1 SCR and the chopper inverter circuit 13, is in no way controlled relative to the zero points in the supply voltage and occur at any point in the cycle of the input supply voltage. Start-up transient levels will depend on the point in the cycle where oscillations of the chopper inverter 13 are initiated. However, in certain applications, this characteristic may cause no problem, so that the added cost of the zero point pulse generator and zero point coincidence circuit can be avoided. In other aspects, the circuit of FIG. 6 is entirely similar to that of FIG. 2 and possesses many of its desirable operating characteristics and features including the capability for "frequency pushing" with changes in loading.

With the circuit arrangement of FIG. 6, as well as that of FIG. 2, it may also be desirable to include a metal oxide transient voltage suppressor device ZNR connected across the power supply terminals 14 and 15A for suppressing or limiting transient voltages appearing across the chopper inverter circuit to some predetermined maximum safe value depending upon the characteristics of the main power controlling SCR Q1. The metal oxide transient voltage suppressor device ZNR may comprise one of the relatively new semiconductor voltage suppressor devices made available in Japan by the Matsushita Electric Industrial Co. and in this country by the Semiconductor Products Department of the General Electric company.

Figure 6A:
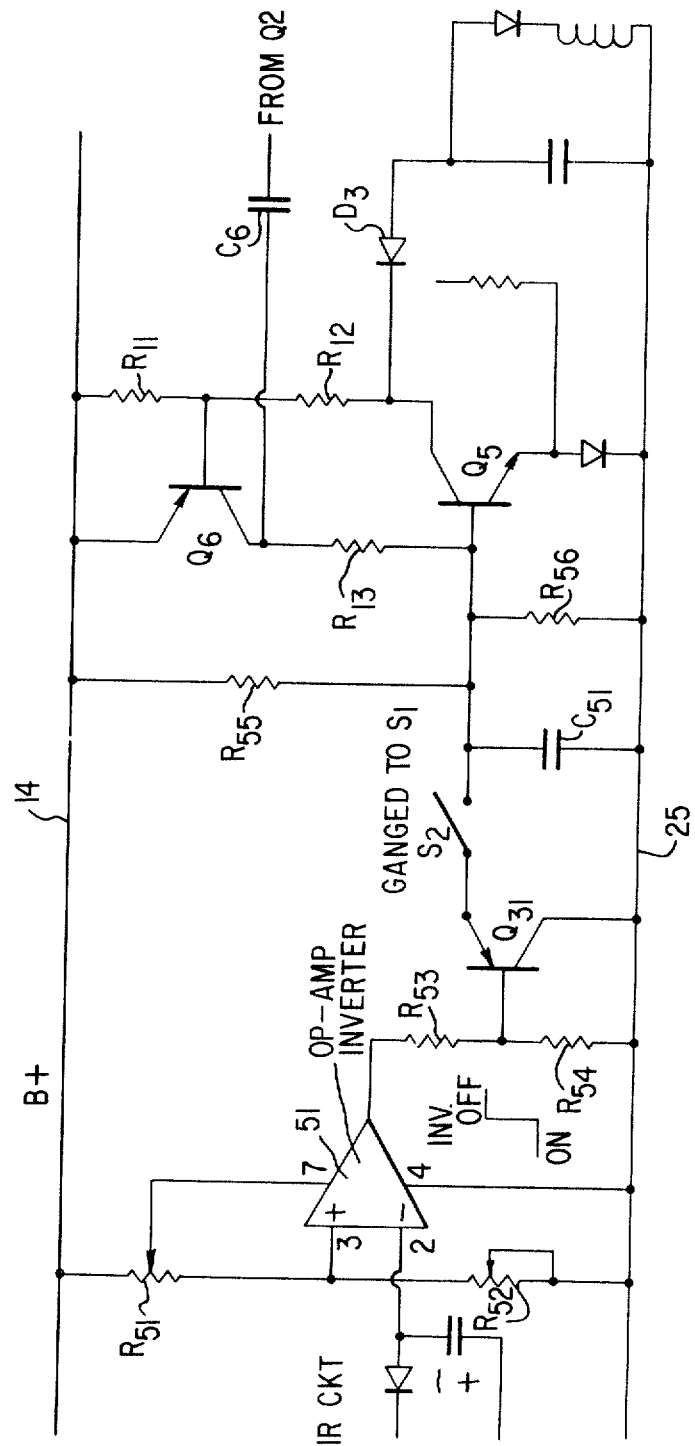
FIG. 6A is a schematic circuit diagram of a modification of the FIG. 6 as well as FIG. 2 circuits and illustrates the manner of connection of a pan temperature control to the circuits.

FIG. 6A of the drawings is a detailed schematic circuit diagram of a modification to the circuits shown in FIG. 6 and FIG. 2 whereby the circuits can be adapted to use a pan temperature sensor for exactly controlling the temperature of the pan being inductively heated. A preferred pan temperature sensor would comprise an infra red sensing device that looks directly at the pan being heated so as to maintain its temperature at a precise set value and may be constructed in the manner described in U.S. Pat. No. 3,710,062. In a preferred form of the pan temperature sensing arrangement a conventional, commercial integrated circuit operational amplifier is connected to operate as a bistable threshold switch and receives its excitation power from across a pair of voltage dividing resistors R51 and R52 connected across the low voltage direct current excitation power supply 14, 25. The output of the op-amp threshold switch supplied through load resistors R53 and R54 to the base of a gating transistor Q31. Gating transistor Q31 is in effect connected in series electrical circuit relationship with the operators on-off control switch S2 so that when it is gated on and conducting it functions in precisely the same manner as S2 when it is closed to turn on the chopper inverter. This assumes that the S2 switch previously was closed by an operator of the equipment so that control over operation of the chopper inverter is surrendered to the temperature sensing amplifier arrangement. Conversely, upon the gating transistor Q31 being turned off by a positive output signal from threshold switch 51, the end effect will be the same as if the operator on off switch S2 were opened thereby causing the chopper inverter to turn-off. The output of threshold switch 51 is designed to go positive only when the sensed pan temperature exceeds a preset level. Hence, the pan temperature sensor controls or modulates the induction cooking unit on and off in accordance with the sensed pan temperature. By this simple modification, the circuit of FIG. 6, readily can be adapted to include the desirable pan temperature sensing feature described previously in detail in U.S. Pat. No. 3,710,062.

If incorporated into a complete cooking range with a number of other induction heating coils, each of the individual induction heating coils L3 and its associated chopper inverter power supply and gating circuitry, will function in precisely the same manner as was described with relationship to FIG. 2 and/or FIG. 6 of the drawings. If desired, the particular induction heating coils L3 may be designed to provide either a greater or smaller amount of power by appropriate design of the coil to produce a larger or smaller induction magnetic field. As was described more fully in the above-referenced U.S. Pat. No. 3,710,062 this is accomplished by increasing or decreasing the number of turns in constructing the induction heating coils, the size and diameter of the coils, and of the wire used in forming the coils, and of course, the size, voltage and current ratings of the chopper inverter power supply components employed to excite the coils. Since it is believed that individual design of the various branch circuits to provide desired levels of output power in respective ones of the branches would be obvious to one skilled in the art, in view of the foregoing teachings, a further description thereof is thought to be unnecessary.

From the foregoing description, it will be appreciated that the present invention provides new and improved induction cooking units which are capable of safe operation with pans or other metal base cookware of all types including highly conductive pans made of aluminum, cooper, or other materials which advertently may be used by a housewife or other operator of the unit. The improved induction cooking unit is capable of operation over a wide number of output power levels including quite low power levels while providing adequate commutating off time intervals for the SCR power thyristor used in the inverter circuit to excite the induction heating coil thereby assuring that the commutating time off intervals are well within the rate of recovery time of the thyristor. Further, the circuit by appropriate design is capable of operation with the production of a minimum of start up and shut down voltage and current transients to assure safe operation. Having described several embodiments of a new and improved induction heating unit for metal base cookware according to the invention, it is believed obvious that other modifications and variations of the invention are possible in the light of the above teachings. It is therefore, to be understood that changes may be made in the particular embodiments of the invention described which are within the full intended scope of the invention as defined by the appended claims.

What is claimed is:

1. An induction heating unit including in combination inverter circuit means comprising gate controlled thyristor means and commutation circuit means coupled together in circuit relationship and excited from a set of power supply terminals, an induction heating coil coupled to and excited by said inverter circuit means in a manner such that the induction heating coil determines at least in part the operating frequency at which the inverter circuit means operates, and gating circuit means coupled to and controlling turn-on of said gate controlled thyristor means, said gating circuit means comprising feed back sensing circuit means coupled to said induction heating coil for deriving a feedback trigger signal synchronized with the frequency of operation of the inverter circuit circuit means, gating signal generator means for generating high frequency signal pulses having a repetition rate determined by the operation frequency for the inverter circuit means and of sufficient energy to insure turn-on of said gate controlled thyristor means, enabling means coupled to and enabling initiation of operation of said gating signal generator means, and alternating current signal coupling circuit means intercoupling said last mentioned enabling means with said feedback sensing circuit means for synchronizing the operation of the gating signal generator means with changes in frequency of the inverter circuit means due to loading and unloading of the induction heating coil.

2. An induction heating unit according to claim 1 wherein the alternating current signal coupling circuit means comprises differentiating circuit means for differentiating the sensed value of the voltage appearing across the induction heating coil and supplying the same back to synchronize operation of the gating signal generator means with the changes in frequency of operation of the inverter circuit means due to loading and unloading of the induction heating coil.

3. An induction heating unit according to claim 1 wherein the inverter circuit means comprises a high frequency chopper-inverter circuit means including inductor and capacitor commutating reactive components having an inductance L1 and capacitance C1, respectively, connected in series circuit relationship across the gate controlled thyristor means in parallel circuit relationship therewith and with the chopper-inverter circuit means thus comprised being connected across the set of power supply terminals for connection to the source of excitation potential through a filter inductor having an inductance L2, said commutating inductor and capacitor being series resonant at a predetermined natural commutating frequency that provides a combined thyristor conduction and commutating period $t_1$ during each cycle of operation and said gating circuit means controlling the turn-on of the gate controlled thyristor means so as to render the thyristor conductive at a controlled frequency of operation.

4. An induction heating unit according to claim 3 further including a smoothing inductor having an inductance L3 and a smoothing capacitor having capacitance C3 connected in series circuit relationship across at least one of the capacitor and inductor commutating reactive components, said smoothing inductor and capacitor having values such that the combined reactive impedance of the capacitor commutating reactive component including the smoothing inductor and the smoothing capacitor is capacitive in nature and series resonates with the inductor commutating component to establish the combined thyristor conduction-commutating period $t_1$, and wherein the smoothing inductor and capacitor shape the output current flowing through the smoothing inductor to a substantially sinusoidal wave shape having little or no radio frequency interference emission effects and improved power coupling, and the smoothing inductor comprises the induction heating coil.

5. An induction heating unit according to claim 4 further including shunt capacitor means and shunt capacitor switching means for switching said shunt capacitor means in parallel circuit relationship across said L3 induction heating coil at low power levels of operation for the induction heating unit whereby the current flowing through the L3 induction heating coil is reduced and the effective commutating capacitance C1 of the commutating capacitor is increased to thereby increase the $t_1$ conduction and commutating time of the gate controlled thyristor means.

6. An induction heating unit according to claim 5 wherein the commutating capacitance C1 is comprised by a plurality of different capacitor elements and further includes C1 switching means for switching in different combinations of capacitor elements in accordance with a desired power level at which the induction heating unit is to operate, and wherein the shunt capacitor means is formed by utilizing appropriate ones of said capacitor elements switched into shunt circuit relationships with L3 induction heating coil at low power levels of operation by the shunt capacitor switching means.

7. An induction heating unit according to claim 6 wherein the source of excitation potential for the induction heating unit comprises full wave rectifier means designed for connection to a source of conventional commercial or residential alternating current and having the output thereof connected across a filter capacitor of a relatively small capacitance value C2, said parallel connected series commutated chopper-inverter circuit means being connected through the L2 filter inductor across the filter capacitor and a metal oxide thyristor transient voltage supressor device connected in parallel circuit relationsip across the chopper-inverter circuit means.

8. An induction heating unit according to claim 7, wherein the induction heating coil comprises a planar, spirally round induction heating coil, a flat insulating support member for supporting inductively heated cooking vessels disposed over the induction heating coil, electrostatic shield means formed on the under surface of the flat, insulating support member for electro-statically shielding the inductively heated cooking vessels from the induction heating coil, the electrostatic shielding means being electrically grounded, and temperature responsive means coupled to sense the operating temperature of at least the L3 induction heating coil, and means coupling the output from the temperature responsive means to control the operation of said gating circuit means to cause shut down of the induction heating unit upon an over-temperature condition being sensed.

9. An induction heating unit according to claim 8 wherein said gating signal generator means comprises a programable unijunction transistor having an anode, an anode-gate and a cathode, a timing capacitor connected in parallel circuit relationship across the anode-cathode of the programable unijunction transistor, output circuit means coupled to the cathode of the programable unijunction transistor for supplying a gating-on signal to said gate controlled thyristor means, adjustable charging resistor means connected in common to the anode and to the timing capacitor, biasing resistor means connected across the series connected charging resistor and programable unijunction transistor and having an intermediate point connected to the anode-gate of the programable unijunction transistor, and terminal means connected across and biasing resistor means for supplying the gating signal generator means with a low voltage direct current excitation potential.

10. An induction heating unit according to claim 9 wherein the enabling means comprises transistor means having its emitter-collector connected in series-circuit relationship with the parallel connected biasing resistor means and series connected charging resistor and timing capacitor and programable unijunction transistor, and having its base connected to the output from feedback sensing circuit means.

11. An induction heating unit according to claim 10 further including operator controlled on-off switch means, and lock out circuit means controlled by said operator controlled on-off switch means and in turn coupled to and locking out operation of said gating signal generator means in response to the on-off condition of said operator controlled on-off switch means.

12. An induction heating unit according to claim 11 wherein the lockout circuit means comprises a set of opposite conductivity type transistors having the base of one transistor connected back to the emittor-collector of the opposite conductivity type transistor so that both transistors latch on or off in response to one of the transistors being turned on or off, one of said latching opposite conductivity type transistors being coupled across the charging capacitor in the gating signal generator means, and one of the transistors having its base electrode connected to have the highest switching potential applied thereto determined by the setting of the operator controlled on-off switch means whereby positive on-off switching of the clamp imposed across the charging capacitor in the gating pulse signal generator means is achieved in response to on-off operation of the operator controlled on-off switch means.

13. An induction heating unit according to claim 1 wherein said gating signal generator means comprises a programable unijunction transistor having an anode, an anode-gate and a cathode, a timing capacitor connected in parallel circuit relationship across the anode-cathode of the programable unijunction transistor, output circuit means coupled to the cathode of the programable unijunction transistor for supplying a gating-on signal to said gate controlled thyristor means, adjustable charging resistor means connected in common to the anode and to the timing capacitor, biasing resistor means connected across the series connected charging resistor and programable unijunction transistor and having an intermediate point connected to the anode-gate of the programable unijunction transistor, and terminal means connected across said biasing resistor means for supplying the gating signal generator means with a low voltage direct current excitation potential.

14. An induction heating unit according to claim 13 wherein the enabling means comprises transistor means having its emittor-collector connected in series-circuit relationship with the parallel connected biasing resistor means and series connected charging resistor and timing capacitor and programable unijunction transistor, and having its base connected to the output from feedback sensing circuit means.

15. An induction heating unit according to claim 13 further including operator controlled on-off switch means, and lock out circuit means controlled by said operator controlled on-off switch means and in turn coupled to and locking out operation of said gating signal generator means in response to the on-off condition of said operator controlled on-off switch means.

16. An induction heating unit according to claim 15 wherein the lockout circuit means comprises a set of opposite conductivity type transistors having the base of one transistor connected back to the emittor-collector of the opposite conductivity type transistor so that both transistors latch on or off in response to one of the transistors being turned on or off, one of said latching opposite conductivity type transistors being coupled across the charging capacitor in the gating signal generator means, and one of the transistors having its base electrode connected to have the highest switching potential applied thereto determined by the setting of the operator controlled on-off switch means whereby positive on-off switching of the clamp imposed across the charging capacitor in the gating pulse signal generator means is achieved in response to on-off operation of the operator controlled on-off switch means.

17. An induction heating unit according to claim 1 further including operator controlled on-off switch means, and lock out circuit means controlled by said operator controlled on-off switch means and in turn coupled to and locking out operation of said gating signal generator means in response to the on-off condition of said operator controlled on-off switch means.

18. An induction heating unit according to claim 1 wherein the source of excitation potential to which the power supply terminals are to be connected provides a periodic undulating excitation potential that drops substantially to zero periodically, and the induction heating unit further includes zero point pulse generator means coupled to the power supply terminals for producing a pulsed output signal at the occurrence of each substantial zero point in the periodic undulating excitation potential, and zero point coincidence circuit means coupled to and controlling operation of said enabling means and in turn coupled to and controlled by said zero point pulse generator means for conditioning said gating signal generator means for operation only at or near the periodic zero point in the periodic undulating excitation potential.

19. An induction heating unit according to claim 18 wherein said zero point coincidence circuit means comprises a bilateral on-off latching switch circuit means having two stable states of operation and capable of being switched from one to the other of its stable states of operation only at or near a zero point in the periodic undulating excitation potential and inhibit circuit means intercoupling said bilateral on-off latching switch circuit means to the gating signal generator means for inhibiting further operation of said gating signal generator means upon the bilateral on-off latching switch means being switched to an off condition only at or near a zero point of the periodic undulating excitation potential.

20. An induction heating unit according to claim 18 further including operator controlled on-off switch means, and lock out circuit means controlled by said operator controlled on-off switch means and in turn coupled to and locking out operating of said gating signal generator means in response to the on-off condition of said operator controlled on-off switch means.

21. An induction heating unit according to claim 20 wherein the lockout circuit means comprises a set of opposite conductivity type transistors having the base of one transistor connected back to the emitter-collector of the opposite conductivity type transistor so that both transistors latch on or off in response to one of the transistors being turned on or off, one of said latching transistors being coupled to said bilateral on-off latching switch circuit means for enabling operation of the bilateral on-off latching switch circuit means at the next zero point of the periodic undulating excitation potential and having its base electrode connected to have a switching on-off potential applied thereto by the operator controlled on-off switch means whereby positive on-off switching of the inhibit imposed on said gating pulse signal generator means by the inhibit circuit means is achieved in response to on-off operation of the operator controlled on-off switch means only at or near a zero point of the supply undulating excitation potential.

22. An induction heating unit according to claim 20 wherein said gating signal generator means comprises a programable unijunction transistor having an anode, an anode-gate and a cathode, a timing capacitor connected in parallel circuit relationship across the anode-cathode of the programable unijunction transistor, output circuit means coupled to the cathode of the programable unijunction transistor for supplying a gating-on signal to said gate controlled thyristor means, adjustable charging resistor means connected in common to the anode and to the timing capacitor, biasing resistor means connected across the series connected charging resistor and programable unijunction transistor and having an intermediate point connected to the anode-gate of the programable unijunction transistor and said enabling means comprises transistor means having its emitter-collector connected in series circuit relationship with the parallel connected biasing resistor means and the series connected charging resistor and parallel connected timing capacitor and programable unijunction transistor, and having its base connected to the output from the feedback sensing circuit means.

23. An induction heating unit according to claim 22 wherein the alternating current signal coupling circuit means comprises differentiating circuit means for differentiating the sensed value of the voltage appearing across the induction heating coil and supplying the same back to synchronize operation of the gating signal generator means with the changes in frequency of operation of the inverter circuit means due to loading and unloading of the induction heating coil.

24. An induction heating unit according to claim 23 wherein the inverter circuit means comprises a high frequency chopper-inverter circuit means including inductor and capacitor commutating reactive components having an inductance L1 and capacitance C1, respectively, connected in series circuit relationship across the gate controlled thyristor means in parallel circuit relationship therewith and with the chopper-inverter circuit means thus comprised being connected across the set of power supply terminals for connection to the source of excitation potential through a filter inductor having an inductance L2, said commutating inductor and capacitor being tuned to series resonance at a predetermined natural commutating frequency that provides a combined thyristor conduction and commutating period $t_1$ during each cycle of operation and said gating circuit means controlling the turn-on of the gate controlled thyristor means so as to render the thyristor conductive at a controlled frequency of operation that provides an operation period T for the chopper-inverter circuit means including a quiescent charging period $t_2$ in each cycle of operation where $T = t_1 + t_2$ such that the value $\omega_2 t_2$ equals substantially $\pi/2$ radians at the operating frequency or greater and where $\omega_2$ equals $1/\sqrt{L_2 C_1}$ whereby the reapplied forward voltage across the thyristor means following each conduction interval is maintained substantially independent of load.

25. An induction heating unit according to claim 24 further including a smoothing inductor having an inductance L3 and a smoothing capacitor having capacitance C3 connected in series circuit relationship across at least one of the capacitor and inductor commutating reactive components, said smoothing inductor and capacitor having values such that the combined reactive impedance of the capacitor commutating reactive component including the smoothing inductor and the smoothing capacitor is capacitive in nature and series resonates with the inductor commutating components to establish the combined thyristor conduction-commutating period $t_1$, and wherein the smoothing inductor and capacitor shape the output current flowing through the smoothing inductor to a substantially a sinusoidal wave shape having little or no radio frequency interference emission effects and improved power coupling, and the smoothing inductor comprises the induction heating oil.

26. An induction heating unit according to claim 25 further including shunt capacitor means and shunt capacitor switching means for switching said shunt capacitor means in parallel circuit relationship across said L3 induction heating coil at low power levels of operation for the induction heating unit whereby the current flowing through the L3 induction heating coil is reduced and the effective commutating capacitance C1 of the commutating capacitor is increased to thereby increase the $t_1$ conduction and commutating time of the gate controlled thyristor means.

27. An induction heating unit according to claim 26 wherein the commutating capacitance C1 is comprised by a plurality of different capacitor elements and further includes C1 switching means for switching in different combinations of capacitor elements in accordance with a desired power level at which the induction heating unit is to operate, and wherein the shunt capacitor means is formed by utilizing appropriate ones of said capacitor elements switched into shunt circuit relationships with L3 induction heating coil at low power levels of operation by the shunt capacitor switching means.

28. An induction heating unit according to claim 27 wherein the source of excitation potential for the induction heating unit comprises full wave rectifier means designed for connection to a source of conventional commercial or residential alternating current and having the output thereof connected across a filter capacitor of a relatively small capacitance value C2, said parallel connected series commutated chopper-inverter circuit means being connected through the L2 filter inductor across the filter capacitor and a metal oxide thyristor transient voltage supressor device connected in parallel circuit relationship across the chopper-inverter circuit means.

29. An induction heating unit according to claim 28 wherein the induction heating coil comprises a planar, spirally wound induction heating coil, a flat insulating support member for supporting inductively heated cooking vessels disposed over the induction heating coil, electrostatic shield means formed on the under surface of the flat, insulating support member for electro-statically shielding the inductively heated cooking vessels from the induction heating coil, the electrostatic shielding means being electrically grounded, and temperature responsive means coupled to sense the operating temperature of at least the L3 induction heating coil, and means coupling the output from the temperature responsive means to control the operation of said gating circuit means to cause shut down of the induction heating unit upon an over-temperature condition being sensed.

* * * * *